(12) United States Patent
Anai et al.

(10) Patent No.: US 6,337,676 B1
(45) Date of Patent: Jan. 8, 2002

(54) FLAT-PANEL DISPLAY DEVICE

(75) Inventors: Kimio Anai; Harutoshi Kaneda, both of Hyogo-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/277,746

(22) Filed: Mar. 29, 1999

(30) Foreign Application Priority Data

Mar. 30, 1998 (JP) .......................................... 10-083649

(51) Int. Cl.[7] .................................................. G09G 3/36
(52) U.S. Cl. ............................ 345/89; 345/98; 348/673
(58) Field of Search ........................... 345/98, 99, 213, 345/204, 89; 348/695, 97, 572, 672, 673, 682, 526, 691, 697, 497; 358/448, 455; 382/172; 380/222; 327/312

(56) References Cited

U.S. PATENT DOCUMENTS

| | | | | |
|---|---|---|---|---|
| 3,790,706 A | * | 2/1974 | Gubala et al. | 348/572 |
| 4,222,068 A | * | 9/1980 | Thompson | 380/222 |
| 4,338,630 A | * | 7/1982 | Engel et al. | 348/695 |
| 4,516,042 A | * | 5/1985 | Nakamura | 327/312 |
| 4,680,633 A | * | 7/1987 | Gerdes et al. | 348/526 |
| 4,707,741 A | * | 11/1987 | Stratton | 348/697 |
| 4,847,695 A | * | 7/1989 | Arai | 358/455 |
| 4,987,495 A | * | 1/1991 | Arai | 358/448 |
| 5,119,194 A | * | 6/1992 | Yamaguchi et al. | 348/497 |
| 5,157,493 A | * | 10/1992 | Hamon et al. | 348/682 |
| 5,210,610 A | * | 5/1993 | Kanashiki et al. | 348/672 |
| 5,251,267 A | * | 10/1993 | Kawamura | 382/172 |
| 5,321,513 A | * | 6/1994 | Kondo et al. | 348/691 |
| 5,339,114 A | * | 8/1994 | Lagoni et al. | 348/673 |
| 5,754,150 A | * | 5/1998 | Matsui | 345/89 |
| 5,771,031 A | * | 6/1998 | Kinoshita et al. | 345/98 |
| 5,874,988 A | * | 2/1999 | Gu | 348/97 |
| 5,926,174 A | * | 7/1999 | Shibamiya et al. | |
| 5,940,058 A | * | 8/1999 | Koyama | 345/89 |
| 5,990,858 A | * | 11/1999 | Ozolins | |
| 6,078,301 A | * | 6/2000 | Arai et al. | 345/10 |
| 6,078,317 A | * | 6/2000 | Sawada | 345/204 |

FOREIGN PATENT DOCUMENTS

JP 6-98284 4/1994

* cited by examiner

Primary Examiner—Steven Saras
Assistant Examiner—Uchendu O. Anyaso
(74) Attorney, Agent, or Firm—Oblon, Spivak, McClelland, Maier & Neustadt, P.C.

(57) ABSTRACT

A flat-panel display device changes the level of a video signal supplied from a video signal source in the horizontal blanking period on the basis of a selected voltage value from a voltage generation circuit, and this voltage is sampled in response to a sampling clock from a timing generation circuit and is latched by a signal line driving circuit. The latched signal is supplied to a flat display panel along with a scanning signal from a scanning line driving circuit to display an image according to the aspect ratio of the flat display panel.

6 Claims, 4 Drawing Sheets

FLAT-PANEL DISPLAY DEVICE

BACKGROUND OF THE INVENTION

The present invention relates to a flat-panel display device used in, e.g., a car navigation apparatus.

A Hi-Vision television receiver and a car navigation apparatus which has prevailed recently contain a flat display screen having an aspect ratio 9:16. Particularly, the car navigation apparatus is designed to drive the flat display panel such as a liquid crystal display panel using a DC power supply of 12 V supplied from a battery. As the density of the pixel electrodes for driving liquid crystals is increased to obtain an display image of a higher resolution, the insulating property of the panel becomes insufficient. Hence, the apparatus must have a display driving circuit designed such that the liquid crystal display panel is driven with a voltage as low as possible.

However, the video signal must have a relatively large voltage amplitude between black and white levels to obtain a satisfactory contrast value in an image displayed on the flat display panel. In addition, this video signal also requires a voltage amplitude for a horizontal synchronization signal incorporated therein. Hence, it is difficult in design to reduce the withstand voltage of the display driving circuit.

BRIEF SUMMARY OF THE INVENTION

It is an object of the present invention to provide a flat-panel display device whose arrangement enables reduction in the withstand voltage of a display driving circuit.

A flat-panel display device according to the present invention comprises a flat display panel; a video signal input unit for receiving an analog video signal which is set at a reference level in a horizontal blanking period and varies within a range from the reference level to a maximum level in a horizontal effective image period; and a display driving circuit for driving the flat display panel on the basis of the analog video signal from the video signal input unit; wherein the display driving circuit includes a level conversion unit for converting the reference level of the analog video signal into an intermediate level determined between the reference and maximum levels in the horizontal blanking period.

With the flat-panel display device, the level conversion unit converts the reference level of the analog video signal into an intermediate level determined between the reference and maximum levels corresponding to black and white levels in the horizontal blanking period. Therefore, the maximum amplitude of the analog video signal can be reduced in a case where a horizontal synchronization signal is incorporated in the analog video signal. Since the ratio of the voltage amplitude of the horizontal synchronization signal to that of the analog video signal can be decreased, the withstand voltage of the display driving circuit can be lowered without changing the contrast value determined by the black and white levels.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A liquid crystal display device according to the first embodiment of the present invention will be described hereinafter with reference to the accompanying drawings.

Figure 1:
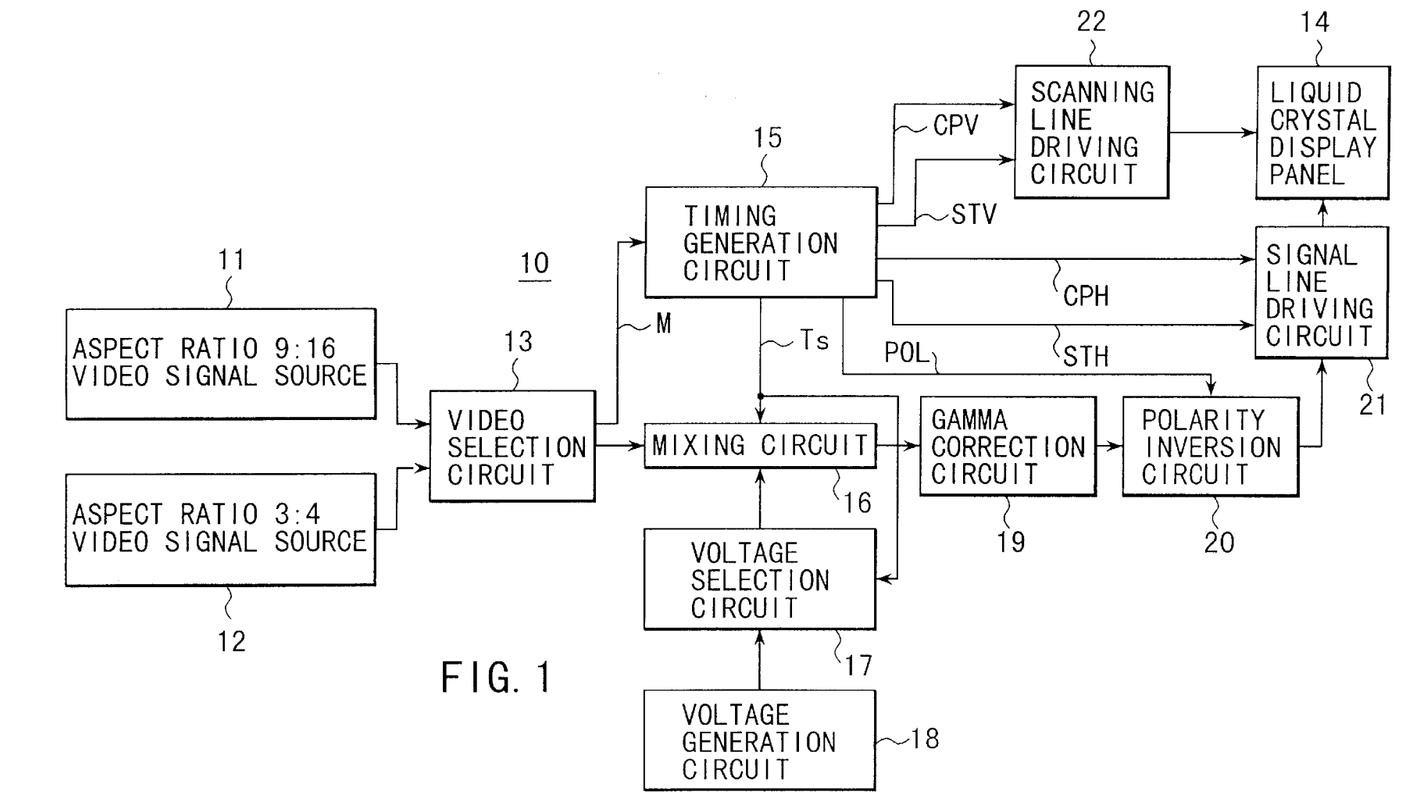
FIG. 1 is a block diagram showing the circuit arrangement according to an embodiment of the present invention.

FIG. 1 is a block diagram showing the circuit arrangement of the liquid crystal display device 10.

This liquid crystal display device 10 is produced as a component of, e.g., a car navigation apparatus. The liquid crystal display device 10 is connected to an external video signal source 11 which generates a video signal that represents an image of an aspect ratio 9:16 like a Hi-Vision signal together with synchronization signals, and an external video signal source 12 which generates a video signal that represents an image of an aspect ratio 3:4 like an NTSC television signal together with synchronization signals, and receives one of these video signals selected by a video selection circuit 13.

Figure 2:
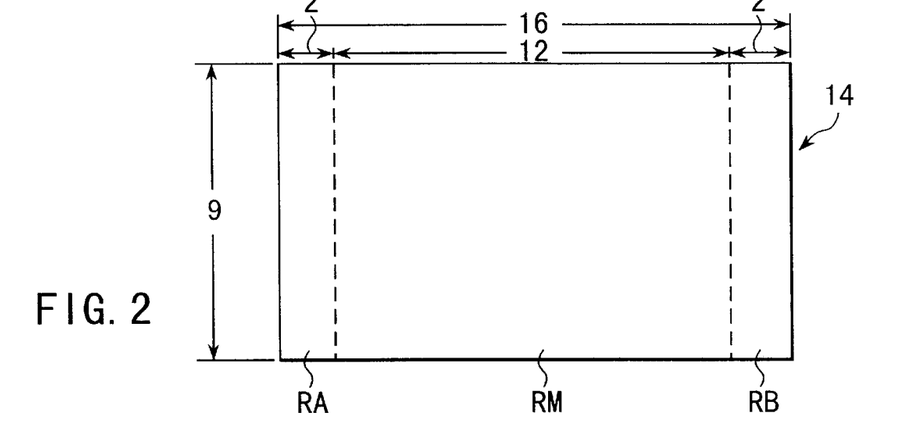
FIG. 2 is an explanatory view upon displaying an image with an aspect ratio 3:4 (9:12) on a display panel with an aspect ratio 9:16.

The liquid crystal display device 10 comprises a liquid crystal display panel 14 having a display screen of an aspect ratio 9:16, as shown in FIG. 2. Hence, a Hi-Vision signal image of the aspect ratio 9:16 is displayed on the entire screen of the liquid crystal display panel 14. However, when an NTSC signal image of the aspect ratio 3:4 is displayed on this liquid crystal display panel 14, if its vertical size is set at 9 to match that of the Hi-Vision signal image of the aspect ratio 9:16, the horizontal size is 12. As a result, when an NTSC image is displayed on a display area RM located at the center of the liquid crystal display panel 14, as shown in, e.g., FIG. 2, residual areas RA and RB of an aspect ratio 9:2 located on the two sides of the display area RM.

As is generally known, the liquid crystal display panel 14 comprises an array substrate which includes a plurality of pixel electrodes arrayed in a matrix of rows and columns, a plurality of scanning lines formed along the rows of the pixel electrodes to transmit a scanning signal, a plurality of data signal lines formed along the columns of the pixel electrodes to intersect the scanning lines, and a plurality of switching elements formed at position near the intersections between the scanning lines and the data signal lines. Furthermore, the liquid crystal display panel 14 comprises a counter substrate which includes a counter electrode set to commonly face the pixel electrodes, and a liquid crystal layer held between the array substrate and counter substrate.

Each switching element is constructed by a thin film transistor (TFT) having a gate connected to one of the scanning lines, and a current path connected between one of the data signal lines and one of the pixel electrodes. The TFT is enabled in response to the scanning signal supplied to the gate via the scanning line, and applies a potential of the data signal line set in accordance with a data signal to the pixel electrode.

The screen of the liquid crystal display panel 14 includes a plurality of pixels which are composed of the pixel electrodes, switch elements, liquid crystal portions, and counter electrode portions respectively corresponding to the pixel electrodes, and transmittance of the liquid crystal portions are controlled by the potential differences applied between the pixel electrodes and the counter electrode.

The video selection circuit 13 shown in FIG. 1 produces a mode signal representing the selected video signal, and supplies the mode signal to a timing generation circuit 15. On the other hand, the selected video signal itself is supplied to a signal mixing circuit 16. The signal mixing circuit 16 receives a predetermined voltage signal generated at a predetermined timing corresponding to the horizontal blanking period by a voltage generation circuit 18 and supplied via a voltage selection circuit 17. The signal mixing circuit 16 performs an operation of mixing the selected video signal and voltage signal under the control of a switching control signal Ts generated by the timing generation circuit 15 during the horizontal blanking period, as will be described in detail later.

The video signal mixed by the signal mixing circuit 16 is supplied to a gamma correction circuit 19. Since a received television signal has normally undergone gamma correction to have gamma characteristics suitable for image reproduction on a CRT screen, if image reproduction is performed on the liquid crystal display panel 14, the difference between the image reproduction characteristics of the CRT and the liquid crystal display panel is reflected in image density, resulting in poor reproduced image quality. Especially, in case of a color image, the color reproducibility deteriorates. For this reason, the gamma correction circuit 19 restores the gamma characteristics for image reproduction on the CRT, and then corrects the gamma characteristics according to the image reproduction characteristics of the liquid crystal display panel 14.

The mixed video signal corrected by the gamma correction circuit 19 is supplied to a polarity inversion circuit 20, and is then output as a video signal whose polarity is inverted, e.g., at every horizontal scanning period. This will be described in detail later.

The video signal is supplied from the polarity inversion circuit 20 to a signal line driving circuit 21 which includes a shift register circuit and other components to latch the video signal. The latched video signal is supplied to the signal lines of the liquid crystal display panel 14 at predetermined timings determined by a sampling clock signal CPH and horizontal start signal STH supplied from the timing generation circuit 15 (to be described in detail later).

As described above, the signal line driving circuit 21 sequentially samples and holds the video signal supplied from the polarity inversion circuit 20 as data signals, and drives the plurality of data signal lines of the liquid crystal display panel 14 in accordance with the data signals. The shift register circuit of the signal line driving circuit 21 is incorporated in first to fourth driver ICs (not shown) having the same arrangement for respectively driving the data signal lines grouped into four blocks.

The number of data signal lines per block is determined independently of the residual areas RA and RB located on the two sides of the display area RM of an NTSC signal image of the aspect ratio 3:4 in the screen of the liquid crystal display panel 14. The first to fourth driver ICs are connected in series with each other to serially transmit the horizontal start signal STH. Each of the driver ICs has at least one shift register constituted by a series of flip-flops assigned to data signal lines of one block.

Each shift register performs an operation of shifting the horizontal start signal STH in response to the sampling clock signal CPH. The first to fourth driver ICs sample and hold a video signal at the timing that the horizontal start signal STH is output from each flip-flop, and supply the held signal onto the data signal line corresponding to the flip-flop as a data signal.

On the other hand, the timing generation circuit 15 generates a vertical start signal STV and vertical scanning clock signal CPV on the basis of the mode signal received from the video selection circuit 13 and a horizontal synchronization signal, and supplies these signals STV and CPV to a scanning line driving circuit 22. The scanning signal driving circuit 22 also includes a shift register circuit constituted by a series of flip-flops.

The shift register circuit of the scanning line driving circuit 22 performs an operation of shifting the vertical start signal STV in response to the vertical scanning clock signal CPV, and outputs a scanning signal onto a scanning line corresponding to a flip-flop that has latched the vertical start signal STV.

Figure 3:
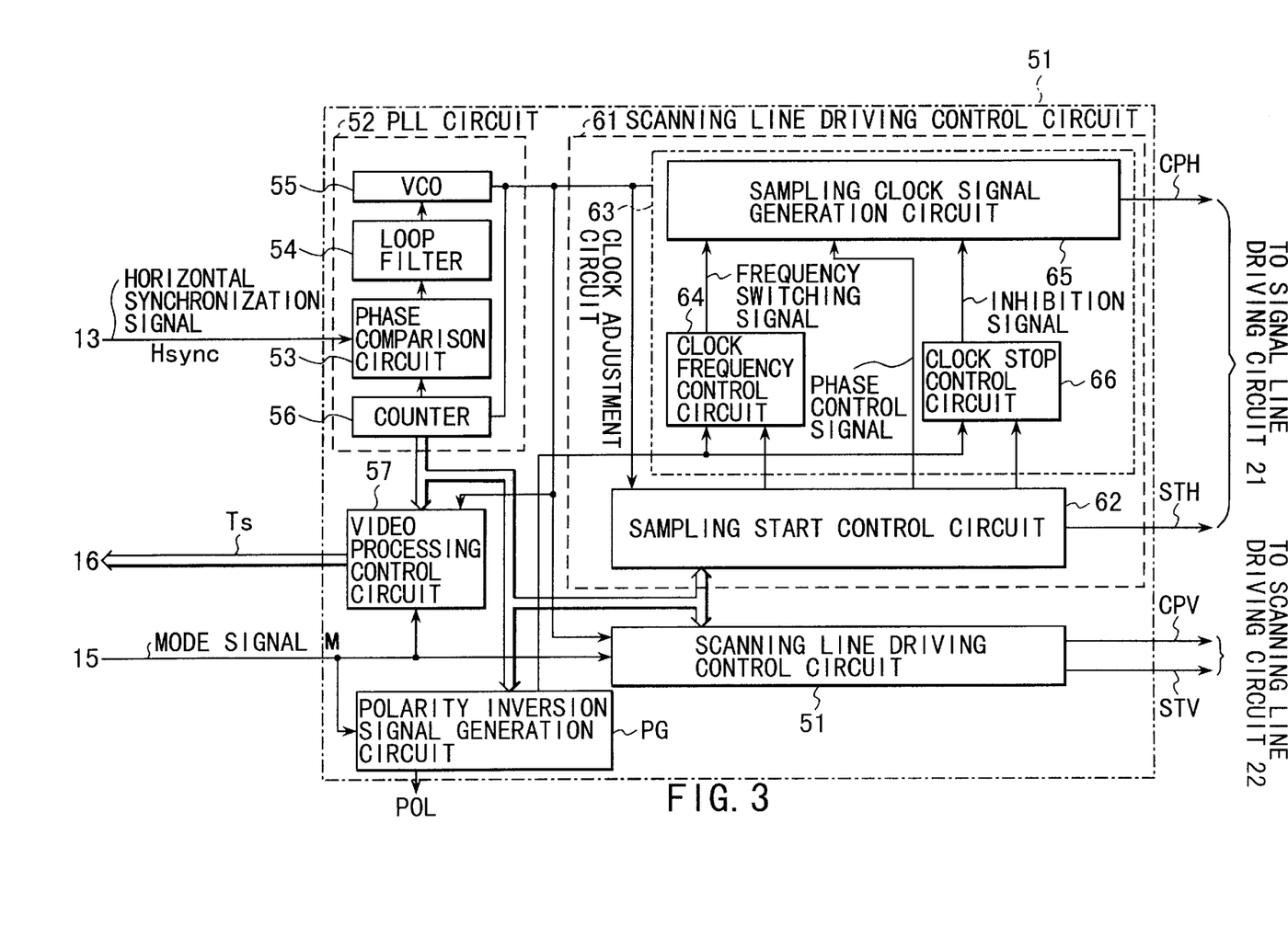
FIG. 3 is a block diagram showing the internal arrangement of a timing generation circuit shown in FIG. 1 in detail.

FIG. 3 is a block diagram showing the circuit arrangement of the timing generation circuit 15 which generates the above-mentioned various timing signals CPH, STH, CPV, STV, Ts, and the like, in detail. The timing generation circuit 15 has a scanning line driving control circuit 51 for outputting the signals CPV and STV, a PLL circuit 52 for generating an internal clock signal synchronized with the horizontal synchronization signal, a signal line driving control circuit 61 for generating the signals CPH and STH, a video processing control circuit 57 for outputting the switching control signal Ts, and a polarity inversion signal generation circuit PG for generating an inversion instruction signal POL.

The PLL circuit 52 comprises a phase comparison circuit 53, loop filter 54, voltage controlled oscillator (VCO) 55, and counter 56. In the PLL circuit 52, the phase comparison circuit 53 detects any phase error between the phase of the horizontal synchronization signal separated from the video signal by a synchronization separation circuit (not shown) included in the video selection circuit 13, and the phase of a reference horizontal clock signal supplied from the counter 56, so as to generate an error signal corresponding to this phase error.

The loop filter 54 generates a signal voltage obtained by removing high-frequency components and noise from the error signal obtained from the phase comparison circuit 53. The VCO 55 generates a pulse signal having an oscillation frequency corresponding to the signal voltage obtained by the loop filter 54 as a reference sampling clock signal, and supplies it to the counter 56. The counter 56 frequency-divides the reference sampling clock signal on the basis of the number of pixels for one line of an image to be displayed on the entire screen of the liquid crystal display panel 14, and supplies it as a reference horizontal clock signal to the phase comparison circuit 53. The reference horizontal clock signal and reference sampling clock signal are also supplied to the scanning line driving control circuit 51, signal line driving control circuit 61, and video signal processing control circuit 57.

The video processing control circuit 57 outputs the switching control signal Ts for controlling the operation of the video signal mixing circuit 16 on the basis of a mode signal M supplied from the video selection circuit 13 and the reference horizontal clock signal supplied from the counter 56. In the NTSC mode, the switching control signal Ts is supplied from the video processing control circuit 57 to the signal mixing circuit 16 to enable a voltage signal supplied from the voltage generation circuit 18 during the horizontal blanking period.

The signal line driving control circuit 61 has a sampling start control circuit 62 for controlling the sampling start timing of a video signal, and a clock adjustment circuit 63 for adjusting the reference sampling clock signal supplied from the PLL circuit 52.

The sampling start control circuit 62 generates control signals such as the horizontal start signal STH, a phase control signal, and the like at predetermined timings in synchronism with the reference horizontal clock signal supplied from the counter 56. These predetermined timings are confirmed with reference to the number of clocks of the reference sampling clock signal supplied from the PLL circuit 52.

The clock adjustment circuit 63 has a sampling clock generation circuit 65 for generating a sampling clock signal CPH having a first or second frequency on the basis of the reference sampling clock signal. This circuit 65 is controlled by a sampling start control circuit 62 and a clock frequency control circuit 64 which generates a frequency switching signal for controlling switching between the first and second frequencies, under the control of the sampling start control circuit 62. Furthermore, the clock adjustment circuit 63 has a clock stop control circuit 66 for generating an inhibition signal for temporarily stopping the sampling clock signal CPH.

The first frequency of the sampling clock signal CPH is the sampling frequency of a Hi-Vision video signal, and its second frequency is that of an NTSC video signal.

A frequency switching signal supplied from the clock frequency control circuit 64 selects the first frequency in the Hi-Vision mode, and selects, in the NTSC mode, the first frequency during the horizontal blanking period of an NTSC video signal and the second frequency lower than the first frequency during an image display (or effective image) period obtained by excluding the horizontal blanking period from one horizontal scanning period of the NTSC video signal.

The inhibition signal is not generated in the Hi-Vision mode, and is generated in the NTSC mode in correspondence with the first-second frequency transition period of the above-mentioned sampling clock signal CPH. More specifically, in the sampling clock signal generation circuit 65, the frequency of the sampling clock signal CPH is switched in accordance with the frequency switching signal during the active period of the inhibition signal.

At this time, the phase of the sampling clock signal CPH is appropriately adjusted by the phase control signal supplied from the sampling start control circuit 62.

The arrangement and operation of the sampling clock signal generation circuit 65 will be described in more detail below with reference to FIGS. 4 and 5. As described above, in this liquid crystal display device, a Hi-Vision video signal is displayed on the entire screen of the liquid crystal display panel 14 shown in FIG. 2 as an image of the aspect ratio 9:16 in the Hi-Vision mode, and an NTSC video signal is displayed on the display area RM shown in FIG. 2 as an image of the aspect ratio 3:4 in the NTSC mode.

Figure 6:
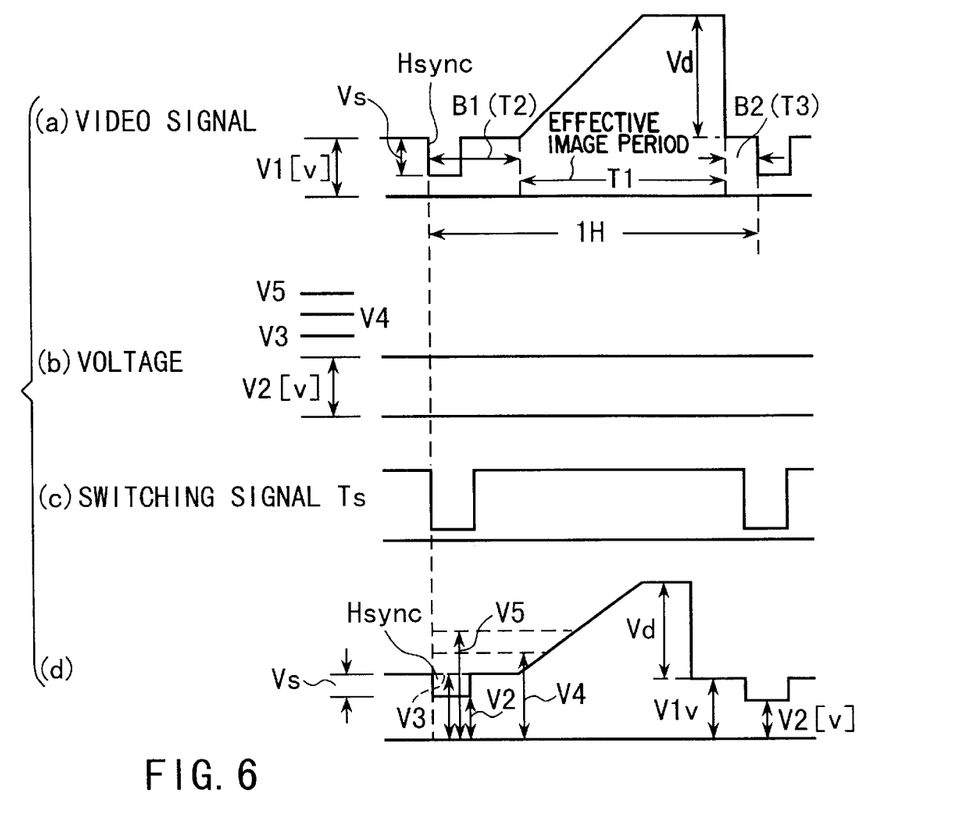
FIG. 6 is a signal waveform chart showing the operation of the embodiment shown in FIG. 1.

For this reason, the Hi-Vision and NTSC video signals must be sampled by the number of pixels corresponding to these aspect ratios during an effective image period T1 in each horizontal scanning period (1H), as exemplified by (a) in FIG. 6. Since one horizontal scanning period (1H) is common to the Hi-Vision and NTSC video signals, a sampling frequency f1 of the Hi-Vision video signal and a sampling frequency f2 of the NTSC video signal satisfy:

$$3f1/4=f2.$$

This reduces to:

$$3 \times f1 = 4 \times f2 \tag{1}$$

As indicated by (a) in FIG. 6, since one horizontal scanning period (1H) of a video signal includes a horizontal blanking period (B1+B2), a period T1 obtained by excluding the horizontal blanking period (B1+B2) is the actual sampling period of a video signal. Since this blanking period occupies around 20% of the entire horizontal scanning period, this sampling period T1 is, for example, given by:

$$T1=0.8H \tag{2}$$

In the NTSC mode, the residual areas RA and RB remain on the two sides of the display area RM of an NTSC signal image, as shown in FIG. 2. On these areas, right and left auxiliary images of the aspect ratio 9:2 may be displayed as needed.

The mixing circuit 16, voltage selection circuit 17, and voltage generation circuit 18 shown in FIG. 1 are used for displaying these right and left auxiliary images. According to the present invention, in order to prevent the total voltage of a voltage component Vs of a horizontal synchronization signal Hsync indicated by (a) in FIG. 6 and a maximum amplitude voltage component Vd of black and white levels during the actual sampling period T1 of a video signal from being applied to the signal line driving circuit 21 and scanning line driving circuit 22, a plurality of voltages V2, V3, V4, and V5 indicated by (b) in FIG. 6 are generated by the voltage generation circuit 18, and one of these voltage is selected in response to a switching signal Ts generated by the timing generation circuit 15 at a timing indicated by (c) in FIG. 6 and is mixed with a video signal.

For example, when the voltage V2 is selected, the voltage amplitude of the horizontal synchronization signal Hsync rises from Vs by the voltage V2, as indicated by (d) in FIG. 6, and the voltage load on the driving circuits is reduced accordingly. At this time, since the black level during the horizontal blanking period remains the same, the residual areas RA and RB are displayed in black.

On the other hand, when the voltage V4 or V5 is selected, since the mixed voltage level during the horizontal blanking period becomes higher than the black level, if this portion is sampled and displayed as right and left auxiliary images, display on the residual areas RA and RB changes from black to gray.

In this case, the period T1 obtained by excluding the horizontal blanking period (B1+B2) is the actual sampling period of a video signal, and the display contents during this period are left unchanged. In addition, the voltage load on the driving circuits is reduced in correspondence with the voltage amplitude of the horizontal synchronization signal.

In order to display auxiliary images on the residual areas RA and RB, auxiliary image signals must be sampled by the number of pixels corresponding to their total aspect ratio 9:4 during 0.2H blanking period (B1+B2).

This number of pixels is determined by the sum of the product of a sampling period T2 and sampling frequency f3 of an auxiliary image signal corresponding to the left auxiliary image, and the product of a sampling period T3 and sampling frequency f4 of an auxiliary image signal corresponding to the right auxiliary image, as indicate by (a) in FIG. 6, and the relationship between this number of pixels and the number of pixels as the product of the sampling period Ti and sampling period f2 matches that between the total aspect ratio 9:4 of these residual areas RA and RB, and the aspect ratio 9:12 of the display area RM, as expressed by:

$$T1 \times f2 : T2 \times f3 + T3 \times f4 = 12 : 4 \qquad (3)$$

Substituting 0.8 for T1 in equation (3) and rearranging yield:

$$T2 \times f3 / F2 + T3 \times f4 / f2 = 0.8H/3 \qquad (4)$$

The sampling frequency f3 of the auxiliary video signal corresponding to the left auxiliary image, and the sampling frequency f4 of the auxiliary video signal corresponding to the right auxiliary image must be set to be higher than the sampling frequency f2 of the NTSC video signal to satisfy equation (4).

The sampling clock signal generation circuit 65 shown in FIG. 3 is constructed to obviate the need for independently generating such sampling frequencies f3 and f4.

Figure 4:
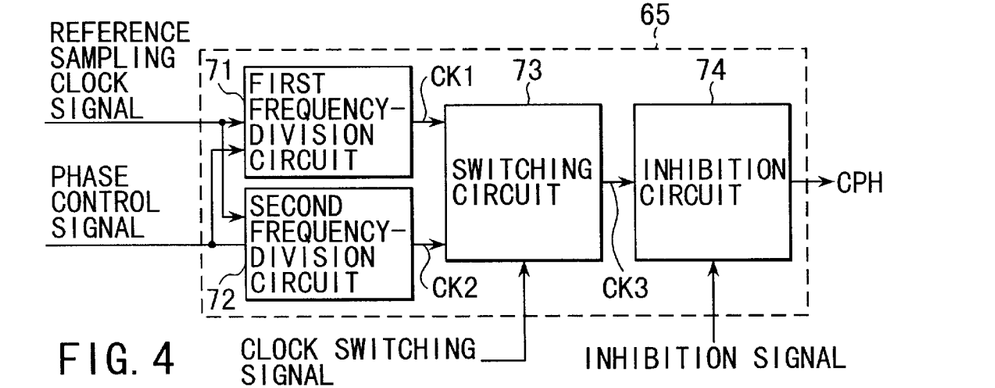
FIG. 4 is a block diagram showing the internal arrangement of a sampling clock signal generation circuit shown in FIG. 3 in detail.
Figure 5:
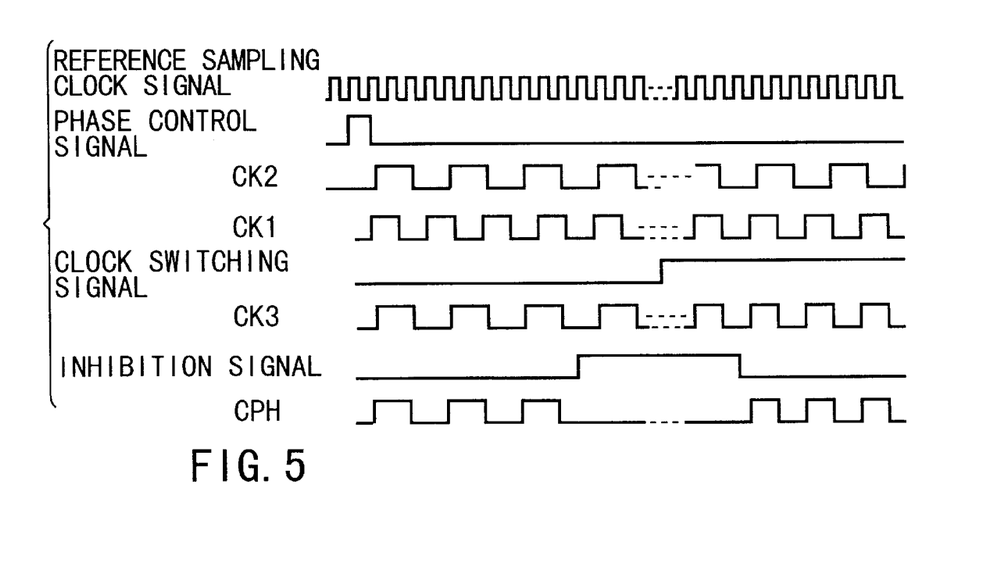
FIG. 5 is a timing chart showing the operation of the circuit shown in FIG. 4.

FIG. 4 shows the circuit arrangement of the sampling clock signal generation circuit 65 in more detail, and FIG. 5 shows signals obtained by the sampling clock signal generation circuit 65. In this sampling clock signal generation circuit 65, a first-frequency clock signal CK1 is used as the sampling frequency f1 for a Hi-Vision video signal, and a second-frequency clock signal CK2 is used as the sampling frequency f2 for an NTSC video signal.

Furthermore, the first frequency CK1 can also be used as the sampling frequencies f3 and f4 for auxiliary video signals since it is set to be higher than the second frequency CK2. More specifically, the sampling clock signal generation circuit 65 is constructed by a first frequency-division circuit 71, second frequency-division circuit 72, switching circuit 73, and inhibition circuit 74.

The first frequency-division circuit 71 frequency-divides the reference sampling clock signal into the first-frequency clock signal CK1, and the second frequency-division circuit 72 frequency-divides it into the second-frequency clock signal CK2. In the first and second frequency-division circuits 71 and 72, the phases of these clock signals CK1 and CK2 are controlled by the phase control signal supplied from the sampling start control circuit 62.

The switching circuit 73 selects one of the clock signals CK1 and CK2 in accordance with a clock switching signal from the clock frequency control circuit 64, and outputs the selected signal as an output clock signal CK3. The inhibition circuit 74 masks the output clock signal CK3 obtained by the switching circuit 73 using the inhibition signal from the clock stop control circuit 66, and outputs it as the sampling clock signal CPH.

The operation of the above-mentioned liquid crystal display device will be explained below.

When the video selection circuit 13 selects the Hi-Vision mode, the mode selection signal M is supplied to the timing generation circuit 15, and a horizontal synchronization signal Hsync for a Hi-Vision video signal is supplied to the timing generation circuit 15 via a switch circuit (not shown). At the same time, the Hi-Vision video signal is supplied to the signal mixing circuit 16.

On the other hand, when the video selection circuit 13 selects the NTSC mode, a horizontal synchronization signal for an NTSC video signal is supplied to the timing generation circuit 15 via a switch circuit, and the NTSC video signal and the selected voltage output from the voltage generation circuit 18 are supplied to the signal mixing circuit 16 via a switch circuit to produce a mixed video signal.

The timing generation circuit 15 generates a reference sampling clock signal on the basis of the horizontal synchronization signal Hsync, and generates a horizontal clock signal based on this reference sampling clock signal, thereby controlling the scanning line driving circuit 22 and signal line driving circuit 21 at each horizontal scanning period (1H) defined by this horizontal clock signal.

Regarding the control of the signal line driving circuit 21, the horizontal start signal STH is generated based on the horizontal clock signal, and the sampling clock signal CPH is generated based on the reference sampling clock signal.

The scanning line driving circuit 22 sequentially drives the plurality of scanning lines during one vertical scanning period. During each horizontal scanning period, a scanning signal is continuously supplied to the corresponding scanning line. The signal line driving circuit 21 drives the plurality of signal lines in correspondence with a video signal supplied from the signal mixing circuit 16 during one horizontal scanning period (1H). In the driver ICs of the signal line driving circuit 21, the shift registers performs an operation of shifting the horizontal start signal STH in response to the sampling clock signal CPH. The Hi-Vision video signal is sampled and held as a data signal at the timing that the horizontal start signal STH is stored in and output from each flip-flop, and is supplied to a data signal line 34 corresponding to this flip-flop.

With this control, in the Hi-Vision mode, a Hi-Vision signal image of the aspect ratio 9:16 is displayed on the entire screen of the liquid crystal display panel 14 shown in FIG. 2. In the NTSC mode, an NTSC signal image of the aspect ratio 3:4 is displayed on the display area RM shown in FIG. 2, and the right and left auxiliary images of predetermined gray level are displayed on the residual areas RB and RA shown in FIG. 2.

The display operation of the right and left auxiliary images of predetermined gray level in the NTSC mode will be described in more detail below with reference to (a) and (d) in FIG. 6.

The timing generation circuit 15 generates the video switching signal Ts in correspondence with the horizontal blanking period (B1+B2) of an NTSC video signal in the NTSC mode.

The voltage selection circuit 17 selects a predetermined voltage generated by the voltage generation circuit 18 under the control of this video switching signal Ts, and supplies the selected voltage to the signal mixing circuit 13 to mix it with a video signal output from the video selection circuit 13. The mixed video signal output from the signal mixing circuit 16 is supplied to the polarity inversion circuit 20 via the gamma correction circuit 19.

The polarity inversion circuit 20 is used for preventing the liquid crystal characteristics from deteriorating by inverting the polarity of a video signal at every horizontal scanning periods (1H). For example, the video signal indicated by (a) in FIG. 6 is inverted at every 1H by the polarity inversion circuit 20 to form a waveform shown in FIG. 7. The video signal shown in FIG. 7 has a video signal waveform before voltage mixing of the present invention, and a voltage Vs+Vd obtained by adding a voltage amplitude component Vs of the horizontal synchronization signal Hsync to a voltage amplitude component Vd used for image display in practice is applied to the driving circuits 21 and 22.

Figure 7:
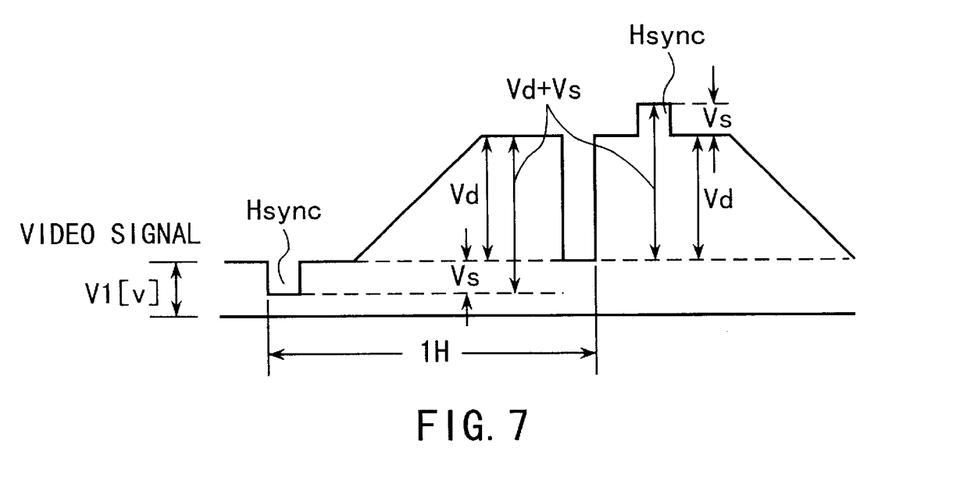
FIG. 7 is a chart showing a video signal whose polarity is inverted.

More specifically, when the driving circuits 21 and 22 have a withstand voltage of 5V, the voltage amplitude Vd is set, for example, to 3V of 1V to 4V in view of the voltage loss caused at the driving circuits 21 and 22. Further, since a gamma correction is performed on the video signal, the reference level of the video signal is set, for example, to 2.1V slightly shifted from an intermediate level of 2.5V between 1V and 4V. In this case, even when the voltage amplitude Vs of the horizontal synchronization signal is incorporated in the voltage amplitude of the video signal, the above driving circuits 21 and 22 are securely or safely operable at the withstand voltage of 5V.

In the present invention, by appropriately selecting the voltage value generated by the voltage generation circuit 18, the right and left auxiliary images of predetermined gray level are displayed on the areas RB and RA, and the maximum voltage value applied to the driving circuits 21 and 22 can be set to fall within the range of the voltage amplitude component Vd which is used for image display in practice.

In order to display the left auxiliary image on the area RA, the mixed video signal is output from the polarity inversion circuit 20, while the horizontal start signal STH and the sampling clock signal CPH of the first frequency generated based on the horizontal synchronization signal Hsync are supplied from the timing generation circuit 15 to the signal line driving circuit 21.

In the signal line driving circuit 21, an auxiliary video signal corresponding to the left auxiliary image, i.e., a voltage of a predetermined value generated by the voltage generation circuit 18 is sampled in response to the sampling clock signal CPH of the first frequency (CK1) after reception of the horizontal start signal STH, and data signals are generated for the number of data signal lines corresponding to the residual area RA and are supplied to these data signal lines.

Upon completion of sampling for the final data signal line of those corresponding to the residual area RA, the inhibition signal shown in FIG. 5 is supplied from the clock stop control circuit 66 to the sampling clock generation circuit 65 (FIG. 3), thus stopping the sampling clock signal CPH for a predetermined period.

During this period, the phase control signal and frequency switching signal are supplied from the sampling start control circuit 62 and the clock frequency control circuit 64 to the sampling clock generation circuit 65, and the video switching signal Ts changes to switch the video signal from the auxiliary video signal from the voltage generation circuit 18 to an NTSC video signal from the video selection circuit 13.

The signal mixing circuit 16 outputs the NTSC video signal from the NTSC video signal generation source 12 in response to the change in video switching signal Ts. When supply of the inhibition signal shown in FIG. 5 is stopped upon outputting the NTSC video signal, the sampling clock generation circuit 65 begins to generate the sampling clock signal CPH of the second frequency (CK2).

In the signal line driving circuit 21, the NTSC video signal is sampled in response to the sampling clock signal CPH of the second frequency (CK2), and data signals are generated for the number of data signal lines corresponding to the display area RM and are supplied to those data signal lines. Upon completion of sampling for the final data signal line of those corresponding to the display area RM, the inhibition signal is supplied again from the clock stop control circuit 66 to the sampling clock generation circuit 65, thus stopping the sampling clock signal CPH for a predetermined period.

During this period, the phase control signal and frequency switching signal are supplied from the sampling start control circuit 62 and the clock frequency control circuit 64 to the sampling clock generation circuit 65, and the video switching signal Ts changes to switch the video signal from the NTSC video signal to an auxiliary video signal for displaying an image on the right area RB.

The signal mixing circuit 16 outputs the auxiliary video signal from the voltage generation circuit 18 in response to the change in video switching signal Ts. When supply of the inhibition signal shown in FIG. 5 is stopped upon outputting the NTSC video signal, the sampling clock generation circuit 65 begins to generate the sampling clock signal CPH of the first frequency (CK1). In the signal line driving circuit 21, the auxiliary video signal corresponding to the right auxiliary image is sampled in response to the sampling clock signal CPH of the first frequency (CK1), and data signals are generated for the number of data signal lines corresponding to the residual area RB and are supplied to those data signal lines.

Subsequently, the next auxiliary video signal corresponding to the left auxiliary image is sampled and the aforementioned operations repeat themselves.

In this way, the left auxiliary image is displayed on the left residual area RA in correspondence with sampling during the former period T2 of the horizontal blanking period (B1+B2) indicated by (a) in FIG. 6, an NTSC signal image is displayed on the display area RM by sampling during the period T1, and the right auxiliary image is displayed on the residual area RB by sampling during the latter period T3 of the horizontal blanking period (B1+B2).

In the liquid crystal display device of the above embodiment, the NTSC video signal is sampled in synchronism with the sampling clock signal CPH of the second frequency CK2, and the auxiliary video signal is sampled in synchronism with the sampling clock signal CPH of the first frequency CK1 higher than the second frequency CK2.

Therefore, sampling of the auxiliary video signal can be completed using the horizontal blanking period of the NTSC video signal. For this reason, the signal line driving circuit 21 need not drive a plurality of data signal lines corresponding to the residual areas RA and RB on the two sides of the display area RM of an NTSC signal image independently of those corresponding to the display area RM of an NTSC signal image. As a result, the number of data signal lines per block driven by each driver IC can be set irrespective of the number of data signal lines corresponding to the residual areas RA and RB. More specifically, in this liquid crystal display device, when an image with high aspect ratio is switched to that with low aspect ratio, the center of the image with low aspect ratio can be easily matched with that of the image with high aspect ratio so as to present a natural image to the observer.

Furthermore, this liquid crystal display device requires neither an increase in the circuit occupation area which increases with increasing number of driver ICs nor an increase in cost.

Moreover, since the sampling clock signal CPH of the first frequency CK1 is used for a Hi-Vision video signal, no independent sampling clock generation circuit is required to sample an auxiliary video signal.

Since the sampling clock signal generation circuit 65 interrupts generation of the sampling clock signal CPH during the period required for switching the clock frequency under the control of the clock stop control circuit 66, the sampling clock signal CPH can be set in a phase suitable for sampling a video signal during this period.

In the above embodiment, a selected voltage generated by the voltage generation circuit 18 is mixed with a video signal in the signal mixing circuit, and the mixed video signal is supplied to the gamma correction circuit 19. For this reason, a plurality of voltages generated by the voltage generation circuit 18 are selectively supplied to the gamma correction circuit 19, and the selected voltage is consequently used in correcting a gamma curve. Hence, since the selected voltage value is known, the degree of gamma correction has a one-to-one correspondence with the selected voltage value. As a result, adjustment and operation confirmation of gamma correction can be easily and accurately done via this voltage value.

Conventional gamma correction is visually done by displaying a gamma curve on an oscilloscope, resulting in cumbersome correction and poor accuracy. As a result, colors displayed on a display device vary depending on personal differences of operators who do the adjustment. However, in the present invention, since the degree of gamma correction can be accurately indicated by the selected voltage value, gamma correction can be done very satisfactorily.

The above description has been given for an embodiment in which the present invention is applied to a liquid crystal display device. However, the present invention is not limited to such specific display device, but can also be applied to various flat-panel display devices such as a plasma display device, and the like.

To recapitulate, according to the present invention, since the level of a horizontal synchronization signal during the horizontal blanking period of a video signal is selectively changed based on a plurality of voltage values generated by a voltage generation circuit to lower the maximum voltage value to be applied to a display driving circuit upon displaying an image having the aspect ratio 3:4 on the flat display panel having the aspect ratio 9:16, a flat-panel display device which can lower the withstand voltage of the display driving circuit in design, and can easily and accurately perform gamma correction can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flat-panel display device comprising:

a flat display panel having a display screen;

a video signal input unit for receiving an analog video signal which is set at a reference level in a horizontal blanking period and varies within a range from the reference level to a maximum level in a horizontal effective image period to represent an image, said analog video signal having a horizontal synchronization signal which causes the reference level to temporarily fall by a preset level in the horizontal blanking period; and a display driving circuit for driving said flat display panel on the basis of the analog video signal;

wherein said display driving circuit includes a level conversion unit for converting the analog video signal into an intermediate level determined between the reference and maximum levels at least in the horizontal blanking period.

2. A flat-panel display device according to claim 1, wherein:

said flat display panel has a plurality of pixels forming the display screen of a first aspect ratio; and said display driving circuit includes a sampling unit for sampling the analog video signal for an image of the first aspect ratio at a first frequency, in the horizontal effective image period and for sampling the analog video signal for an image of a second aspect ratio smaller than the first aspect ratio at a second frequency lower than the first frequency in the horizontal effective image period and at a frequency higher than the second frequency in the horizontal blanking period.

3. A flat-panel display device according to claim 2, wherein said level conversion unit includes a voltage generating unit for generating a plurality of voltage levels different from each other, and a signal mixing unit for selectively mixing the voltage levels generated by the voltage generating unit with the analog video signal in the horizontal blanking period.

4. A flat-panel display device according to claim 3, wherein said display driving circuit further includes a polarity inversion circuit for inverting a polarity of the analog video signal every predetermined period.

5. A flat-panel display device according to claim 4, wherein said display driving circuit further includes a gamma correction circuit disposed at a stage preceding to said polarity inversion circuit, for performing a gamma correction on the analog video signal.

6. A flat-panel display device according to claim 5, wherein said gamma correction circuit is arranged to restore the analog video signal on which a gamma correction for a CRT has been performed, and to perform a gamma correction for said flat display panel on the restored analog video signal.

* * * * *